Patented July 6, 1937

2,085,787

UNITED STATES PATENT OFFICE 2,085,787

PROCESS OF SEPARATING LOWER ALKYLAMINES

Robert Roger Bottoms, Birmingham, Ala., assignor to The Girdler Corporation, Louisville, Ky., a corporation of Delaware No Drawing. Application October 22, 1936, Serial No. 107,025

5 Claims. (Cl. 260—127)

This invention relates to the separation of lower alkylamines, and it particularly relates to the separation of methylamines.

In processes of producing alkylamines, and particularly methylamines, by reacting the corresponding alkyl chlorides, halides, hydroxides and so forth, with ammonia or ammonium salts such as ammonium chloride, the reaction product usually contains substantial quantities of all three of the primary, secondary and tertiary amines, even though the temperature, pressure, proportions and other reaction conditions may be controlled so as to give rise to a preponderance of one of said amines.

These amines being of similar behavior and having only slightly different chemical and physical properties are difficult to separate, whether present as free bases or in the form of their hydrohalide salts.

I am aware that various special methods have been proposed for separating these amines, such as fractional distillation of azeotropic mixtures under superatmospheric pressure, with or without the addition of large quantities of ammonia, and fractional crystallization of the hydrohalide salts from a solvent such as alcohol. None of these methods is as simple or direct, nor does it produce as sharp a separation, as that which I am about to describe.

I have found that the lower alkylamines may be separated one from the other by taking advantage of their differences in basicity. In my preferred process, the amines, present as free bases, are treated with a mineral acid in sufficient quantity and of sufficient strength to combine with one or more of the amines to form a salt.

The dissociation constants of the amines are a measure of their basicity. For the purpose of my invention these dissociation constants are as follows:

|  | Methyl | Ethyl | Propyl |
| --- | --- | --- | --- |
| Mono | 0.00050 | 0.00056 | 0.00047 |
| Di | 0.00074 | 0.00126 | 0.00102 |
| Tri | 0.000074 | 0.00064 | 0.00055 |

It is evident from the above that each of the amines of a group has a different dissociation constant and therefore a different basicity. I have found that this fact enables me to accomplish a separation of certain of the amines from the others. Even though each of the primary, secondary and tertiary amines in one group has a different basicity, it is not economically feasible with my process to separate those which have approximately the same basicity. For example, in the case of the methylamines, it is entirely practical to treat a mixture of the three free amines with a quantity of mineral acid stoichiometrically equivalent to the mono and dimethylamines present in the mixture and subsequently to boil out or otherwise remove the uncombined trimethylamine. It is not, however, economically possible to obtain a sharp separation by treating a mixture of the three bases with only sufficient acid to combine with the dimethylamine present. The difference in basicity between the mono and dimethylamines is so small that good separation is not obtained.

In the case of the ethyl and propyl amines it is entirely practical to treat a mixture of the free bases with sufficient mineral acid to combine with the secondary amine present and then treat the solution to separate the other amines. It is not practical, however, to treat the residual mixture with a further quantity of acid in an effort to separate the tertiary amine from the primary amine.

For the purpose of my invention it is practical to treat mixtures of the free amines with a quantity of mineral acid which is equivalent stoichiometrically to the secondary alkylamine present in the mixture and to any other alkylamine present which has a dissociation constant larger than 60% of the dissociation constant of the secondary alkylamine present.

It is also obvious from the above discussion that the amines may be separated by treating a mixture of their hydrohalide salts with a sufficient quantity of alkali to liberate the weaker amines. This fact forms the basis for my co-pending application Serial No. 107,024.

The preferred mineral acids for carrying out my invention are the hydrohalic acids and sulphuric acid, and these compounds are utilized in just sufficient amount to combine with the desired amine or amines.

For the complete separation of the methylamines, it is possible to apply my process for combining the mono and dimethylamines present in the mixture and then to boil out the uncombined trimethylamine. After the trimethylamine has been driven off by heating, the residual solution may be evaporated to dryness and extracted with chloroform, whereupon the monomethylamine hydrochloride will remain insoluble while the dimethylamine hydrochloride will go into solution.

As another method of separation, the free bases may be carefully distilled to separate the monomethylamine, and the residue then treated with a quantity of acid equivalent to the dimethylamine present so as to separate it from the trimethylamine.

In the case of the ethyl and propyl amines, the secondary amines can be separated from the others by my process and the primary and tertiary amines may then be separated from each other by fractional distillation.

As examples of the method of applying my invention, I give the following examples which are merely illustrative:

*Example 1.*—A mixture of 120 grams of monomethylamine, 700 grams of dimethylamine and 140 grams of trimethylamine, all by weight, is dissolved in water containing 710 grams of HCl. After thorough agitation, the solution is heated to approximately its boiling point, whereby the trimethylamine originally present is distilled out of the solution. The mono and dimethylamines remain in solution as hydrochlorides, and can be separated by the usual means.

*Example 2.*—A mixture containing 400 grams of monoethylamine, 400 grams of diethylamine and 200 grams of triethylamine is dissolved in water containing 268 grams of $H_2SO_4$. The solution, after complete agitation, is heated to approximately its boiling point, whereby all of the mono and triethylamines are removed from the solution, the diethylamine remaining fixed as a sulfate.

It is obvious that the various amines may be separated by many variations of the above procedures from varying mixtures, depending upon the proportions of each amine in the mixture. My process is equally applicable to mixtures containing only two rather than all three of the amines of a series. For example, it may be applied to a mixture of di and trimethylamines.

This application is a continuation in part of my prior and copending application Serial No. 18,883, filed April 29, 1935 and which has been abandoned.

Having thus described my invention, what I claim as new and desire to secure by Letters Patent is:—

1. In the process of separating primary, secondary and tertiary lower alkylamines, the steps of reacting a mixture of said amines in free condition with a quantity of mineral acid stoichiometrically equivalent to the secondary alkylamine present in the mixture and to any other alkylamine present which has a dissociation constant larger than 60% of the dissociation constant of the secondary alkylamine present, and treating the resulting mixture to separate the uncombined bases.

2. In the process of separating methylamines, the steps of treating a mixture of said amines in free condition with a quantity of hydrohalic acid stoichiometrically equivalent to the mono and dimethylamines present in the mixture, and heating the resulting mixture to separate the uncombined trimethylamine.

3. The method of separating dimethylamine from trimethylamine, which comprises treating a mixture of said amines in their free state with a quantity of hydrochloric acid stoichiometrically equivalent to the dimethylamine present, and treating the resulting mixture to separate the uncombined trimethylamine.

4. The method of separating diethylamine from a mixture containing other ethyl amines, which comprises treating said mixture with a hydrohalic acid in stoichiometrical proportion to the diethylamine present in the mixture and thereafter treating the mixture to remove the uncombined amines present.

5. The method of separating dipropylamine from a mixture containing other propyl amines, which comprises treating said mixture with a hydrohalic acid in stoichiometrical proportion to the dipropylamine present in the mixture and thereafter treating the mixture to remove the uncombined amines present.

ROBERT ROGER BOTTOMS.